United States Patent
Cr et al.

(10) Patent No.: US 10,268,387 B2
(45) Date of Patent: Apr. 23, 2019

(54) META-GROUPS IN NON-VOLATILE STORAGE BASED ON PERFORMANCE TIMES

(71) Applicant: SanDisk Technologies LLC, Plano, TX (US)

(72) Inventors: Narendhiran Cr, Bangalore (IN); Satya Kesav Gundabathula, Bangalore (IN); Muralitharan Jayaraman, Bangalore (IN); Chittoor Devarajan Sunilkumar, Bangalore (IN); Satrajit Chakraborty, Bangalore (IN)

(73) Assignee: SanDisk Technologies LLC, Addison, TX (US)

( * ) Notice: Subject to any disclaimer, the term of this patent is extended or adjusted under 35 U.S.C. 154(b) by 31 days.

(21) Appl. No.: 15/398,495

(22) Filed: Jan. 4, 2017

(65) Prior Publication Data
US 2018/0188956 A1    Jul. 5, 2018

(51) Int. Cl.
*G06F 3/06*        (2006.01)

(52) U.S. Cl.
CPC .......... *G06F 3/061* (2013.01); *G06F 3/0644* (2013.01); *G06F 3/0653* (2013.01); *G06F 3/0659* (2013.01); *G06F 3/0688* (2013.01)

(58) Field of Classification Search
USPC ...................................................... 711/103
See application file for complete search history.

(56) References Cited

U.S. PATENT DOCUMENTS

| | | | |
|---|---|---|---|
| 8,700,961 B2 | 4/2014 | Lassa et al. | |
| 8,725,935 B2 | 5/2014 | Huang et al. | |
| 8,918,577 B1 * | 12/2014 | Gorobets | G11C 5/02 711/102 |
| 9,092,340 B2 | 7/2015 | Sprouse et al. | |
| 9,286,960 B2 | 3/2016 | Takeyama et al. | |
| 9,323,662 B2 | 4/2016 | Gavens | |
| 9,355,929 B2 | 5/2016 | Tzafrir | |
| 2011/0153911 A1 * | 6/2011 | Sprouse | G11C 7/1042 711/103 |
| 2012/0311244 A1 * | 12/2012 | Huang | G11C 7/1042 711/103 |
| 2012/0324314 A1 * | 12/2012 | Seshadri | G06F 11/1048 714/773 |

(Continued)

*Primary Examiner* — Shawn X Gu
*Assistant Examiner* — Jean C Edouard
(74) *Attorney, Agent, or Firm* — Vierra Magen Marcus LLP

(57) ABSTRACT

Technology is described herein for performing memory array operations in multiple memory dies in parallel. The memory dies, or groups of non-volatile memory cells on the memory dies, may exhibit different performance times for memory array operations. For example, non-volatile memory cells on one memory die may program more slowly than those on another memory die. The performance times of the memory dies (or groups of the memory cells on different memory dies) may be characterized relative to one another. Memory dies having similar performance times may be placed into the same meta-groups. Meta-groups may be formed at the die, zone, or block level. The meta-groups can be re-formed over the lifetime of the memory system, which can account for changes in performance times over the lifetime of the memory system.

20 Claims, 13 Drawing Sheets

(56) References Cited

U.S. PATENT DOCUMENTS

| | | | | |
|---|---|---|---|---|
| 2013/0132645 A1* | 5/2013 | Danilak | ................ | G06F 13/385 |
| | | | | 711/103 |
| 2013/0159601 A1* | 6/2013 | Lassa | ................... | G11C 29/883 |
| | | | | 711/103 |
| 2014/0215126 A1* | 7/2014 | Avila | ................. | G06F 12/0246 |
| | | | | 711/103 |
| 2014/0351496 A1* | 11/2014 | Avila | .................... | G11C 11/412 |
| | | | | 711/103 |
| 2015/0160857 A1* | 6/2015 | Gorobets | ................ | G06F 3/061 |
| | | | | 711/103 |
| 2015/0262714 A1* | 9/2015 | Tuers | ............... | G11C 29/50004 |
| | | | | 714/721 |
| 2015/0301755 A1* | 10/2015 | Chodem | ............. | G06F 11/141 |
| | | | | 714/764 |
| 2015/0331626 A1* | 11/2015 | Avila | ................... | G06F 3/0679 |
| | | | | 711/103 |

* cited by examiner

| DIE | ORIGINAL CADD | NEW CADD | RELATIVE SPEED |
|---|---|---|---|
| DIE-0 | 000 | 000 | 3 |
| DIE-1 | 001 | 001 | 4 |
| DIE-2 | 010 | 010 | 1 |
| DIE-3 | 011 | 110 | 6 |
| DIE-4 | 100 | 100 | 7 |
| DIE-5 | 101 | 101 | 8 |
| DIE-6 | 110 | 011 | 2 |
| DIE-7 | 111 | 111 | 5 |

PACKAGE 0

| DIE | ORIGINAL CADD | NEW CADD | RELATIVE SPEED |
|---|---|---|---|
| DIE-0 | 000 | 000 | 1 |
| DIE-1 | 001 | 011 | 4 |
| DIE-2 | 010 | 001 | 2 |
| DIE-3 | 011 | 010 | 3 |

PACKAGE 1

| DIE | ORIGINAL CADD | NEW CADD | RELATIVE SPEED |
|---|---|---|---|
| DIE-0 | 000 | 001 | 2 |
| DIE-1 | 001 | 011 | 4 |
| DIE-2 | 010 | 000 | 1 |
| DIE-3 | 011 | 010 | 3 |

PACKAGE 2

| DIE | ORIGINAL CADD | NEW CADD | RELATIVE SPEED |
|---|---|---|---|
| DIE-0 | 000 | 010 | 3 |
| DIE-1 | 001 | 001 | 2 |
| DIE-2 | 010 | 000 | 1 |
| DIE-3 | 011 | 011 | 4 |

PACKAGE 3

| DIE | ORIGINAL CADD | NEW CADD | RELATIVE SPEED |
|---|---|---|---|
| DIE-0 | 000 | 010 | 3 |
| DIE-1 | 001 | 011 | 4 |
| DIE-2 | 010 | 000 | 1 |
| DIE-3 | 011 | 001 | 2 |

FIG. 7C

META-GROUPS IN NON-VOLATILE STORAGE BASED ON PERFORMANCE TIMES

BACKGROUND

The present disclosure relates to technology for non-volatile storage.

Semiconductor memory is used in various electronic devices. For example, non-volatile semiconductor memory is used in cellular telephones, digital cameras, personal digital assistants, mobile computing devices, non-mobile computing devices and other devices. Electrical Erasable Programmable Read Only Memory (EEPROM) and flash memory are among the most popular non-volatile semiconductor memories.

Typically, the memory device has a memory controller and one or more memory packages. The memory package has one or more memory dies ("memory dies" may also be referred to as "memory dice"). Each memory die contains non-volatile storage elements (e.g., memory cells), as well as read and write circuitry. The memory package also contains addressing circuitry in order to properly address the memory cells. As one example, the memory package includes NAND flash memory. However, memory packages other than NAND flash are known.

The memory controller controls operation of the various memory packages. For example, the memory controller sends commands to the memory package to perform memory array operations (e.g., read, write, erase). The commands typically specify an address, which can include a logical unit address (LUN). The LUN may specify which memory die is to perform the memory array operation.

To achieve better performance, a memory controller may issue memory array operations to different memory die, which execute the operations in parallel.

BRIEF DESCRIPTION OF THE DRAWINGS

FIG. 7C includes some tables to illustrate another embodiment in which CADD are changed in order to, in effect, form meta-groups.

DETAILED DESCRIPTION

Technology is described herein for performing memory array operations in multiple memory dies in parallel. The memory dies, or groups of non-volatile memory cells on the memory dies, may exhibit different performance times for memory array operations. For example, non-volatile memory cells on one memory die may program more slowly than those on another memory die. Other memory array operations such as read or erase could also exhibit die to die variation. In one embodiment, the performance times of the memory dies (or groups of the memory cells on different memory dies) are characterized relative to one another. Embodiments disclosed herein form meta-groups based on relative performance times of groups of memory cells. Memory dies (or subsets of the memory cells on different memory dies) having similar performance times may be placed into the same meta-groups. Each meta-group includes memory cells on at least two memory dies. Commands may be issued to a meta-group, wherein memory array operations are performed in parallel in different memory dies. Forming the meta-groups based on performance times improves overall performance.

Figure 1A:
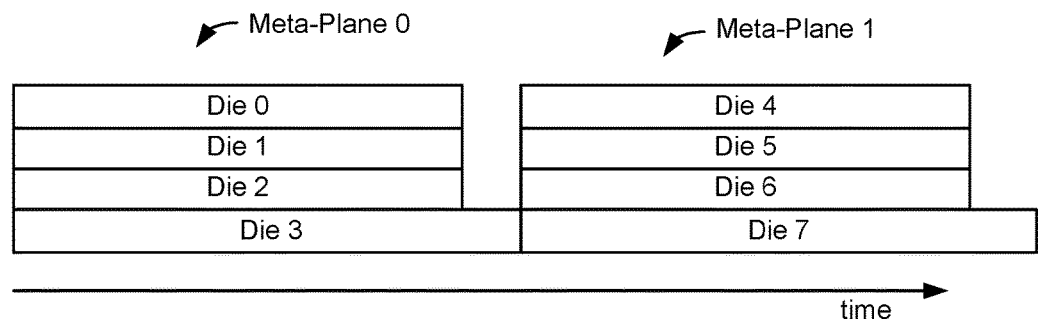
FIG. 1A is a representation of the amount of time it takes for each memory die to complete a memory array operation, such as a program operation.

Referring to FIG. 1A, consider the following example in which there are eight memory dies (die 0 to die 7) in a memory package. As one example, memory die 0 to die 3 are grouped into a meta-plane 0, and memory die 4 to die 7 are grouped into meta-plane 1. This mapping could be based on the physical location of the die in the package, but that is not required. Due to variation in performance between the memory dies, the performance of each meta-plane may be limited by the worst performing die in the meta-plane.

FIG. 1A is a representation of the amount of time that is characteristic for each memory die to complete a memory array operation, such as a program operation. For the sake of illustration, first the memory die in meta-plane 0 program data. Then, after all of the memory dies in meta-plane 0 have finished the memory array operation, the memory dies in meta-plane 1 may being a memory array operation.

FIG. 1A is a representation of a scenario in which the two memory dies having the worst performance time are on different meta-planes. In this example, memory die 3 and memory die 7 have the slowest performance time. Thus, memory die 3 limits the parallel performance of memory array operations in meta-plane 0. Memory die 7 limits the parallel performance of memory array operations in meta-plane 1.

Figure 1B:
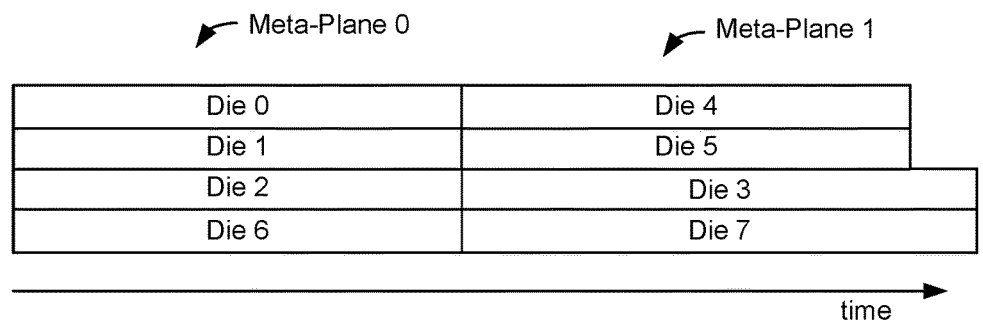
FIG. 1B shows a re-mapping of the dies to meta-planes based on performance times in accordance with one embodiment.

In one embodiment, the performance times of the memory dies are characterized relative to one another. In one embodiment, memory dies having similar performance times are placed into the same meta-planes. For example, the fastest performing dies may be placed into one meta-plane and the slowest dies may be placed into another meta-plane. FIG. 1B shows a re-mapping of the dies to meta-planes in accordance with one embodiment. Memory die 3 has been swapped (logically) with memory die 6. Note that this is not a physical swapping of these two dies. With the re-mapping, meta-plane 0 will not be slowed by the slow performing die 3. Hence, the parallel performance time of meta-plane 0 is improved. Moreover, since memory die 7 is already a slow performing die, putting memory die 3 into meta-plane 1 does not appreciably slow the parallel performance of meta-plane 1. Thus, the performance time of meta-plane 0 is improved. Also, the overall performance time of meta-plane 0 and meta-plane 1 is improved.

FIG. 1B shows one embodiment in which meta-groups are formed at the die level. This is referred to herein as "meta-planes". Meta-groups can also be formed at the block level, or zone level. A zone refers to a group of memory blocks on the same memory die. Forming the meta-groups can be performed once or many times over the lifetime of the memory system. Re-forming the meta-groups over time accounts for changes in performance times over the lifetime of the memory system.

Figure 2A:
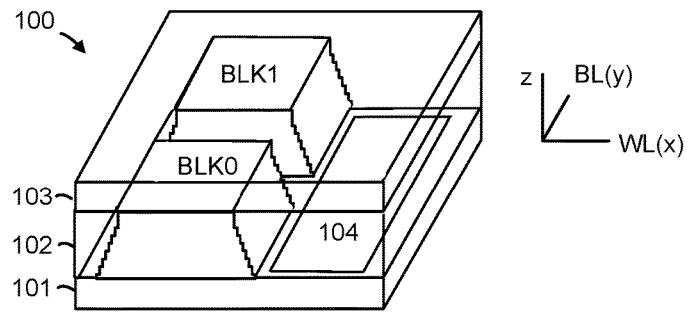
FIG. 2A is a perspective view of a 3D stacked non-volatile memory device in which embodiments may be practiced.

FIG. 2A is a perspective view of a 3D stacked non-volatile memory device in which embodiments may be practiced. The memory device 100 includes a substrate 101. On and above the substrate are example blocks BLK0 and BLK1 of memory cells (non-volatile storage elements). Also on the substrate is a peripheral area 104 with circuitry for use by the blocks. The substrate 101 can also carry circuitry under the blocks, along with one or more lower metal layers which are patterned in conductive paths to carry signals of the circuitry. The blocks are formed in an intermediate region 102 of the memory device. In an upper region 103 of the memory device, one or more upper metal layers are patterned in conductive paths to carry signals of the circuitry. Each block comprises a stacked area of memory cells, where alternating levels of the stack represent word lines. In one possible approach, each block has opposing tiered sides from which vertical contacts extend upward to an upper metal layer to form connections to conductive paths. While two blocks are depicted as an example, additional blocks can be used, extending in the x- and/or y-directions. The z-direction represents a height of the memory device. Additionally, note that components are considered to be connected if they are directly connected or indirectly connected.

Figure 2B:
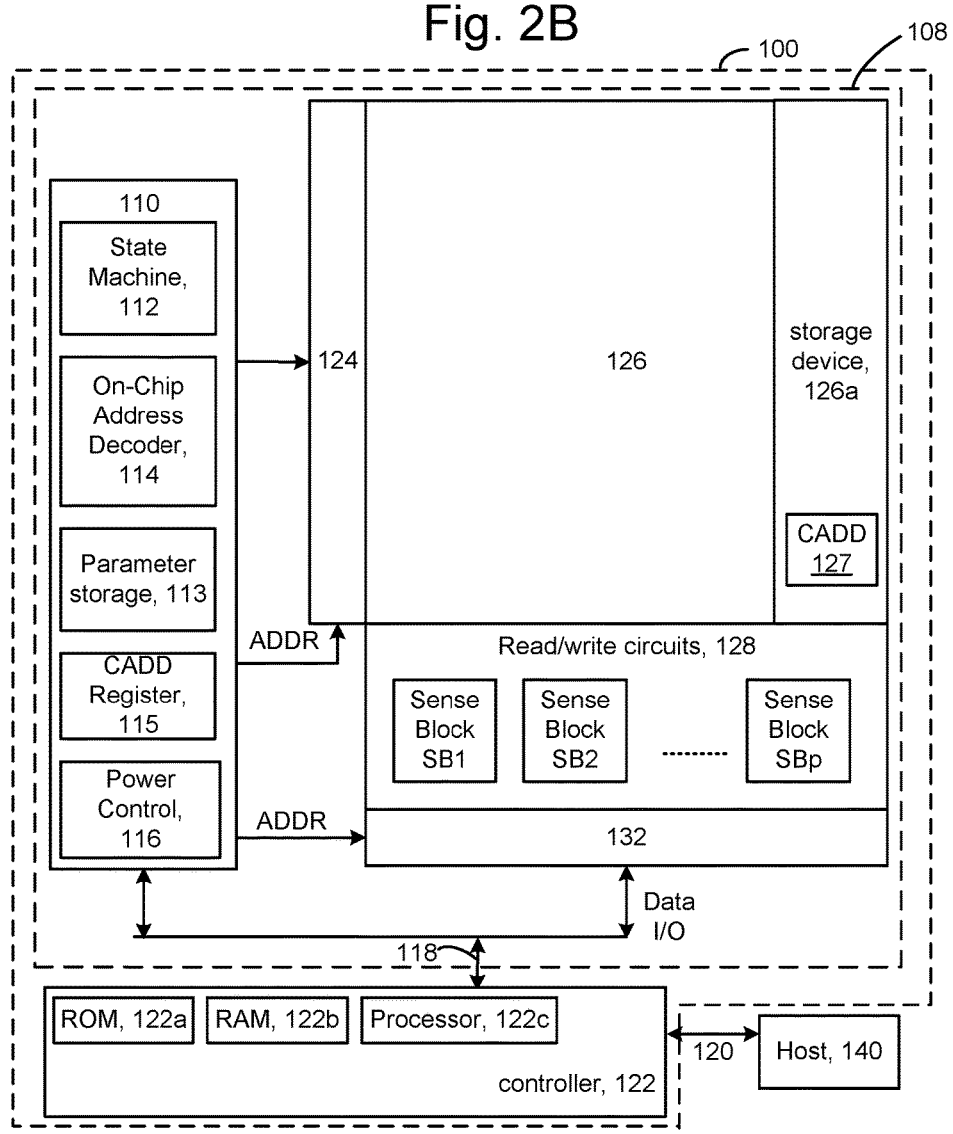
FIG. 2B is a functional block diagram of a memory device such as the 3D stacked non-volatile memory device of FIG. 2A.

FIG. 2B is a functional block diagram of a memory device such as the 3D stacked non-volatile memory device 100 of FIG. 2A. The memory device 100 may include one or more memory die 108. The memory die 108 includes a memory structure 126 of memory cells, such as an array of memory cells, control circuitry 110, and read/write circuits 128. The memory die 108 may include multiple planes, but multiple planes are not required. The memory structure 126 is addressable by word lines via a row decoder 124 and by bit lines via a column decoder 132. In a 3D configuration, the memory structure can include the blocks BLK0 and BLK1 of FIG. 2A. The read/write circuits 128 include multiple sense blocks SB1, SB2, . . . , SBp (sensing circuitry) and allow a page of memory cells to be read or programmed in parallel. Typically a controller 122 is included in the same memory device 100 (e.g., a removable storage card) as the one or more memory die 108. In some embodiments, one controller will communicate with multiple memory dies. Commands and data are transferred between the host 140 and controller 122 via a data bus 120 and between the controller and the one or more memory die 108 via lines 118. In one embodiment, the die 108 is part of a package that has pins or pads, which form part of the physical interface to the die. Certain pins (or alternatively pads) may be designated as I/O pins. In one embodiment, there are eight I/O pins (or pads). In one embodiment, there are sixteen I/O pins (or pads). However, a different number of pins may be designated as I/O pins.

Memory structure 126 can be a two dimensional structure or a three dimensional structure of memory cells (e.g., NAND flash memory cells). The memory structure may comprise one or more array of memory cells including a 3D array. The memory structure may comprise a monolithic three dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Memory structure 126 includes a storage device area 126*a* (alternatively referred to as a ROM area) in which management information of the memory system 100 is stored. The ROM area 126*a* is a part of the memory cell array 126 and is an area constituted by NAND memory cells. In one embodiment, the memory controller 122 can rewrite the ROM area 126*a*, but a user of the memory system 100 cannot access (read, write, or erase) the ROM area 126*a*. Management information of various types is stored in the ROM area 126*a*. The management information includes non-volatile storage for a CADD (Chip Address) 127. The CADD may also be referred to as a LUN (Logical Unit Number). The CADD may comprise n-bits, which is used to uniquely identify the memory die 108. When multiple memory dies 108 are enabled by the same chip enable (CE), each memory die 108 may have a unique CADD.

The control circuitry 110 cooperates with the read/write circuits 128 to perform memory operations on the memory structure 126, and includes a state machine 112, an on-chip address decoder 114, parameter storage 113, CADD register 115, and a power control module 116. The state machine 112 provides chip-level control of memory operations. Parameter storage 113 may be provided for storing operational parameters. The CADD register 115 stores a CADD for the memory die 108. In one embodiment, whenever the memory die 108 experiences a power on reset, the CADD 127 stored in the ROM area 126*a* is read and stored into the CADD register 115. The CADD register 115 is volatile storage, in some embodiments. In some embodiments, when the memory die 108 receives a command from the controller 112, the control circuitry 110 reads the CADD from the CADD register 115 and compares it to a LUN in the command to determine whether the command is for the memory die 108.

The on-chip address decoder 114 provides an address interface between that used by the host or a memory controller to the hardware address used by the decoders 124 and 132. In one embodiment, the on-chip address decoder 114 translates the address in a command from the memory controller 122 such that it is compatible for the memory mapping of the memory array 126.

The power control module 116 controls the power and voltages supplied to the word lines and bit lines during memory operations. It can include drivers for word line layers (WLLs) in a 3D configuration, SGS and SGD transistors and source lines. The sense blocks can include bit line drivers, in one approach. An SGS transistor is a select gate transistor at a source end of a NAND string, and an SGD transistor is a select gate transistor at a drain end of a NAND string.

In various embodiments, one or more of control circuitry 110, state machine 112, decoders 114/124/132, power control module 116, sense blocks SB1, SB2, . . . , SBp, read/write circuits 128, and controller 122 can be thought of a control circuit which is configured to perform the functions described herein.

The off-chip controller 122 may comprise a processor 122c and storage devices (memory) such as ROM 122a and RAM 122b. The storage devices comprises code such as a set of instructions, and the processor 122c is operable to execute the set of instructions to send read, write, erase, and other commands to the memory die 108. Alternatively or additionally, processor 122c can access code from a storage device 126a of the memory structure, such as a reserved area of memory cells in one or more word lines. The controller stores a meta-group table in some embodiments. The meta-group table defines the physical memory cells that are part of a meta-group. For example, the meta-group table may map memory dies to the meta-groups based on performance times of the memory dies, or performance times of some group of memory cells on the memory dies. The meta-group table could be stored in RAM 122b, ROM 122a, or elsewhere on the memory system 100.

Many types of semiconductor memory devices can be used in the memory structure 126. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations.

When the memory structure 126 is a NAND flash memory, the various components on the die 108 may be referred to as a NAND device. Thus, in this example, the memory controller 122 sends commands to the NAND device over lines 118. Other types of non-volatile memory in addition to NAND flash memory can also be used. For example, flash memory devices may be configured in a NAND or a NOR configuration. The memory system 100 is not limited to flash memory.

The memory devices in the memory structure 126 can be formed from passive and/or active elements, in any combinations. By way of non-limiting example, passive semiconductor memory elements include ReRAM device elements, which in some embodiments include a resistivity switching storage element, such as an anti-fuse or phase change material, and optionally a steering element, such as a diode or transistor. Further by way of non-limiting example, active semiconductor memory elements include EEPROM and flash memory device elements, which in some embodiments include elements containing a charge storage region, such as a floating gate, conductive nanoparticles, or a charge storage dielectric material.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements. The columns may be arranged in a two dimensional configuration, e.g., in an x-y plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Thus, in one embodiment, the non-volatile storage elements are arranged as a vertically oriented NAND strings. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this technology is not limited to the two dimensional and three dimensional exemplary structures described but covers all relevant memory structures within the spirit and scope of the technology as described herein and as understood by one of skill in the art.

Figure 2C:
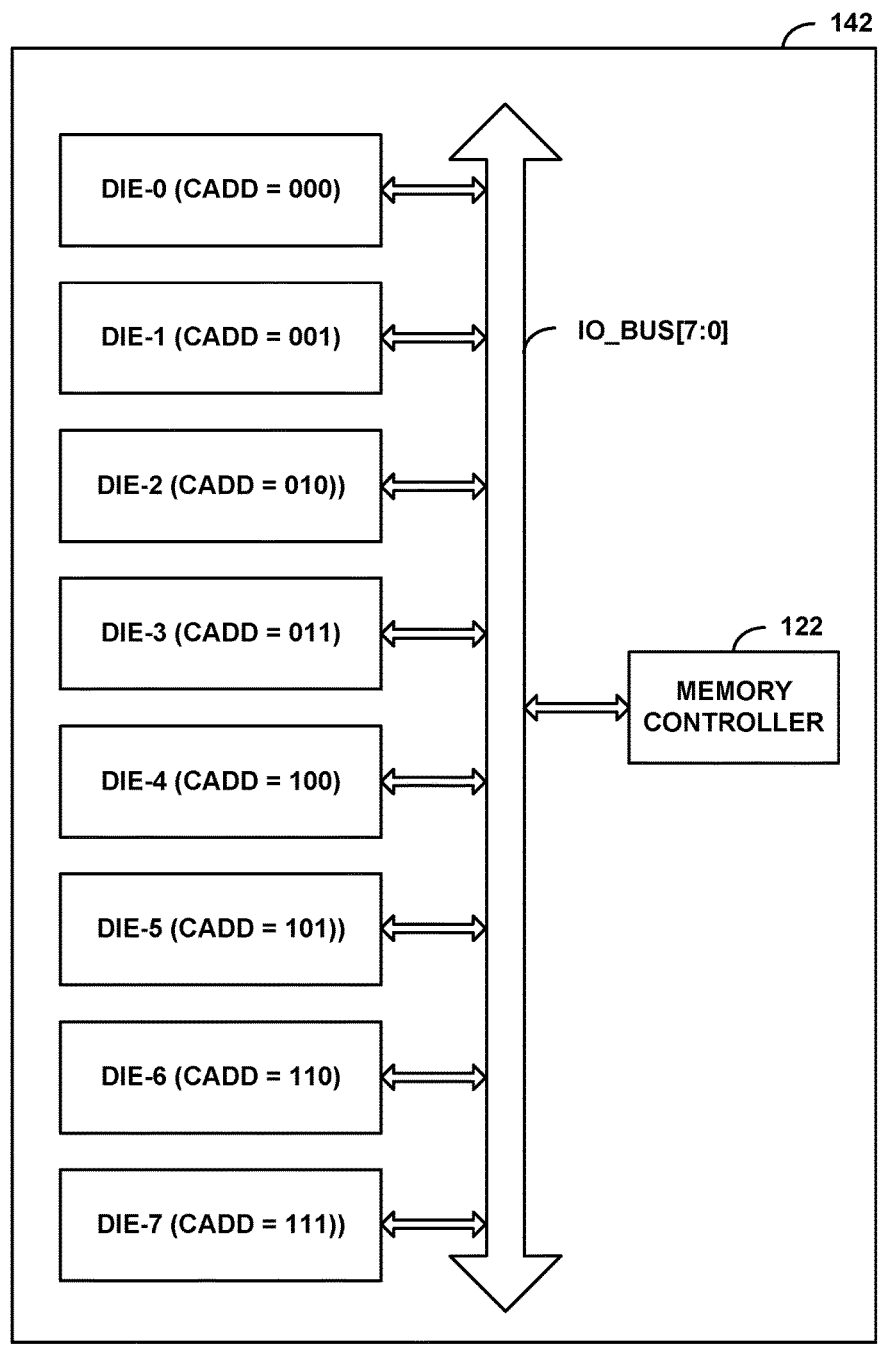
FIG. 2C depicts an embodiment of a portion of a system, such as memory system in FIG. 2A, included within a package.

Some embodiments of a non-volatile storage system will include multiple memory die 108 in communication with one or more Controllers. Each of the memory die 108 may have multiple planes. FIG. 2C depicts an embodiment of a portion of a system, such as memory system 100 in FIG. 2A, included within a package 142. The portion of the system includes memory die DIE-0, DIE-1, . . . , DIE-7 and a memory controller 122 connected to memory die DIE-0, DIE-1, . . . , DIE-7 via a shared 8-bit I/O bus IO_BUS[7:0]. Although eight memory die are depicted in FIG. 2C, memory controller 122 may be connected to or in communication with more than or fewer than eight memory die via a shared I/O bus.

In some cases, memory die DIE-0, DIE-1, . . . , DIE-7 may be vertically stacked within package 122 or arranged in a horizontal manner within package 142. In some cases, package 124 may include a BGA package, a TSOP package, or other type of package. As depicted, memory controller 122 may include a memory controller, such as memory controller 122 in FIG. 2A, and may broadcast various status commands and receive data via the shared TO_BUS[7:0]. Memory die DIE-0, DIE-1, . . . , DIE-7 may include NAND Flash memory die, ReRAM memory die, or other type of memory die.

Each of memory die DIE-0, DIE-1, . . . , DIE-7 includes a CADD (Chip Address). The CADD could be stored in non-volatile memory (e.g., CADD 127, FIG. 2B) or volatile memory (e.g., CADD register 115, FIG. 2B). The CADD specifies the address of the memory die within package 142. In this example, DIE-0 has a CADD "000", DIE-1 has a CADD "001", and so on. Thus, each memory die DIE-0 through DIE-7 have CADD "000" through "111," indicating an 8-die package. In one embodiment, each die is provided with the same chip enable signal.

Figure 2D:
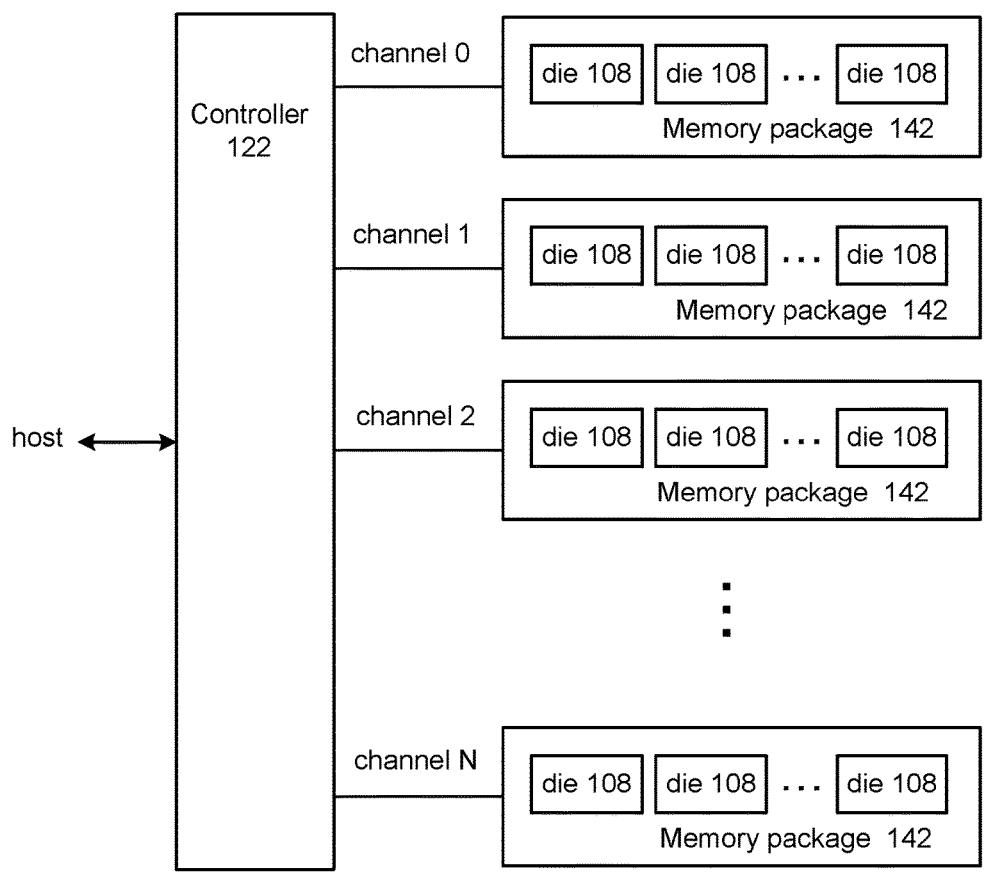
FIG. 2D show N memory packages, and N channels for communication between Controller and the memory die of respective packages.

In one example, depicted in FIG. 2D, the multiple memory dies 108 can be grouped into a set of one or more packages. Each memory package 142 includes one or more memory dies 108 in communication with Controller 122. FIG. 2D show N memory packages 142, and N channels for communication between Controller 122 and the memory dies 108 of respective packages. Controller 122 communicates with the host. In other embodiments, Controller 122 can communicate with any entity via a wired or wireless network (or other type of) connection.

Each memory package 142 may have a set of pins (or alternatively pads) that are configured for input and/or output. The pins (or pads) form part of the interface (FIG. 2B, 118) between the controller 122 and the memory package 142. Some of the pins (or pads) may be designated as I/O pins. This may allow for commands, addresses, and data to be received from the memory controller 122, as well as for data and other information to be returned to the memory controller 122. These pins (or pads) are compliant with a version of the Open NAND Flash interface (ONFI) specification, in one embodiment. However, the pins (or pads) are not required to be compliant with any version of the ONFI specification (even if the memory package is a NAND device). Also note that the memory package 142 is not required to be a NAND device.

Controller 122 receives a request from the host to program host data (data received from the host) into the memory system. In some embodiments, Controller 122 will arrange the host data to be programmed into units of data. For example, Controller 122 can arrange the host data into pages, word line units, blocks, super blocks, or other units. Super blocks are units of data that are programmed and read together, but span across multiple memory dies 108. However, other arrangements can also be used.

Figure 2E:
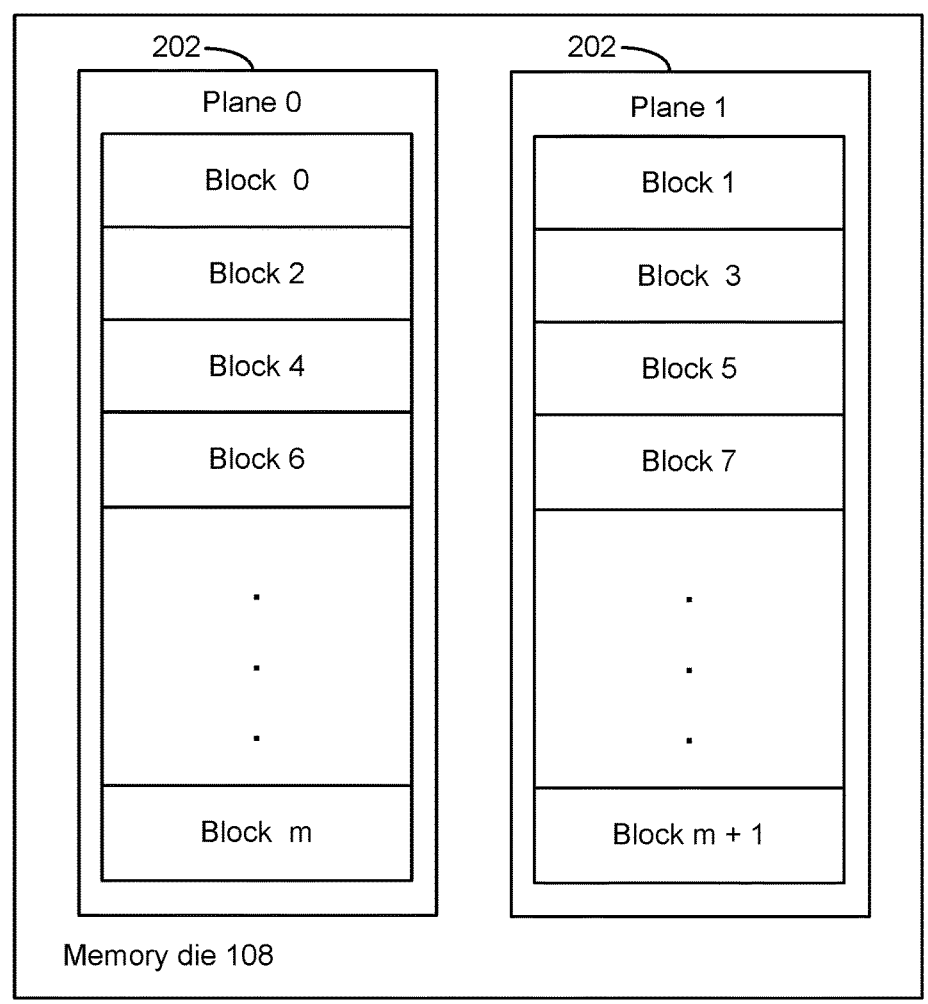
FIG. 2E is a diagram of one embodiment of blocks in a multi-plane memory die.

FIG. 2E is a diagram of one embodiment of blocks in a multi-plane memory die 108. The multi-plane memory die 108 has two planes 202 (Plane 0, Plane 1) in this example. In other embodiments, there could be more than two planes (e.g., four planes, eight planes, etc.). In one embodiment, a memory die 108 has a single plane. Each plane 202 has a number of physical blocks. In this example, Plane 0 has even blocks (Block 0, Block 2, . . . Block m), and Plane 1 has odd blocks (Block 1, Block 1, . . . Block m+1). Thus, the block addresses are interleaved between the two planes. The memory die 108 could be used for, but is not limited to, any of the dies 108 in FIG. 2B, 2C or 2D.

Each plane 202 is able to perform command execution independent of the other plane 202. For example, each plane 202 may contain its own data registers (e.g., page register, cache register, data register, etc.) and other circuitry to allow such parallel execution. The data registers and other circuitry are not depicted in FIG. 2E. There are many other ways in which blocks can be allocated to planes. In one embodiment, a meta-plane is logically formed from one plane on each of a set of two or more memory dies.

Figure 3:
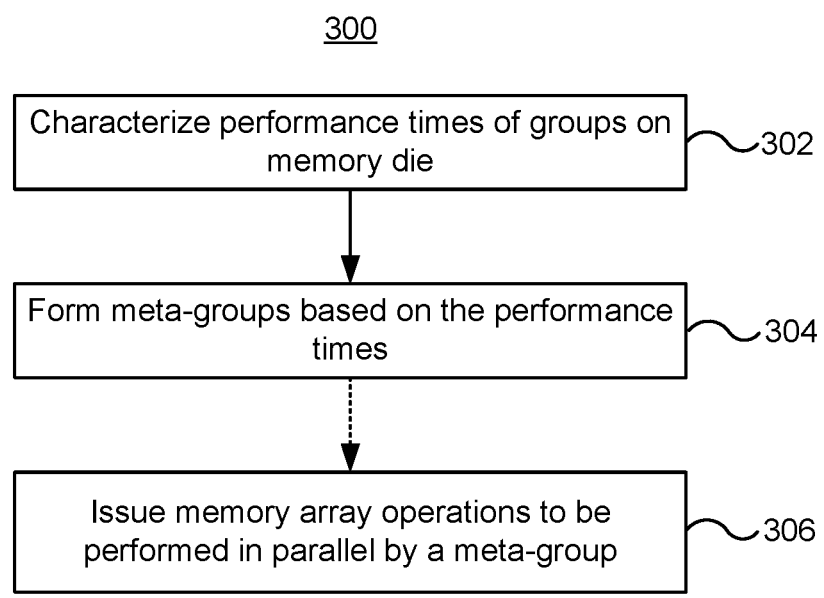
FIG. 3 is a flowchart of one embodiment of a process of operating multiple memory dies in non-volatile storage in parallel.

FIG. 3 is a flowchart of one embodiment of a process 300 of operating multiple memory dies in non-volatile storage in parallel. In one embodiment, the control circuit described in connection with FIG. 2B performs process 300. Process 300 will be described with respect to the control circuit, but could be performed by a different entity. The process 300, in general, is divided into forming meta-groups based on performance times (steps 302-304) and issuing commands based on the meta-groups (step 306). Steps 302-304 might be performed only once or many times over the lifetime of the memory system 100. In one embodiment, steps 302-304 are performed when the memory system 100 is manufactured. In one embodiment, steps 302-304 are performed each time the memory system undergoes a power on reset. Steps 302-304 could be performed in response to other conditions, such as every "x" program/erase cycles in the memory system. Thus, note that the process 300 can change the meta-groups over the lifetime of the memory system. This allows the process 300 to account for operational changes, such as changes in performance times of memory array operations.

In step 302, the control circuit characterizes performance times of groups of non-volatile memory cells. In one embodiment, step 302 includes loading firmware into the memory controller 122. This firmware could be loaded from storage device region 126a or from outside of the memory system, as two examples. Thus, the memory controller 112 may issue commands (e.g., memory array operations such as program, read, or erase) to the various memory dies 108 in step 302. It is also possible to have external testing circuitry initiate the performance tests. This testing circuitry might be connected to pins or pads of a memory die.

In step 302, the control circuit may compare (e.g., rank) the performance times of groups of non-volatile memory cells that reside on different memory dies. In one embodiment, the performance times of various memory dies are compared with each other. In one embodiment, the performance times of planes on different memory dies are compared with each other. In one embodiment, the performance times of various blocks of non-volatile memory cells on different memory dies are compared with each other. In one embodiment, the performance times of various zones that contain multiple blocks of non-volatile memory cells are compared with each other. For example, zones on different memory dies may be compared to each other. In one embodiment, step 302 includes ranking the groups in accordance with their performance times.

In step 304, the control circuit forms meta-groups based on the performance times. In one embodiment, each meta-group includes non-volatile memory cells on multiple memory dies. In one embodiment, step 304 includes establishing memory die addresses based on the performance times. For example, a CADD in one or memory dies may be changed. In one embodiment, the CADD 127 in the storage region 126a is changed or established for the first time. In one embodiment, the value in the CADD register 115 is changed or established for the first time. In one embodiment, step 304 includes storing a meta-group table in the memory system 100. The table is stored in RAM 122b, in one embodiment. Several examples of meta-group tables are described herein.

In step 306, the memory controller issues memory array operations for non-volatile memory cells in respective meta-groups to execute in parallel. As a result of steps 302-304, the overall performance times of memory array operations for multiple meta-groups may be reduced. The dashed line between steps 304 and 306 indicates that considerable time may pass between these two steps.

FIGS. 1A-1B illustrate one example of forming meta-groups based on the performance times. In this example, the meta-groups are formed on the memory die level. In FIGS. 1A and 1B, all eight memory dies could be in the same memory package, but that is not required. In one embodiment of step 302, the control circuit measures or otherwise characterizes performance times of each of the memory dies. In the example of FIGS. 1A and 1B, memory dies 3 and 7 are the slowest. In one embodiment of step 304, Meta-Plane 0 is formed from dies 0, 1, 2, and 6; Meta-Plane 1 is formed from dies 3, 4, 5, and 7. Thus, the meta-planes are formed based on the performance times. Memory dies with similar performance times are placed in the same meta-plane, in one embodiment.

Figure 4A:
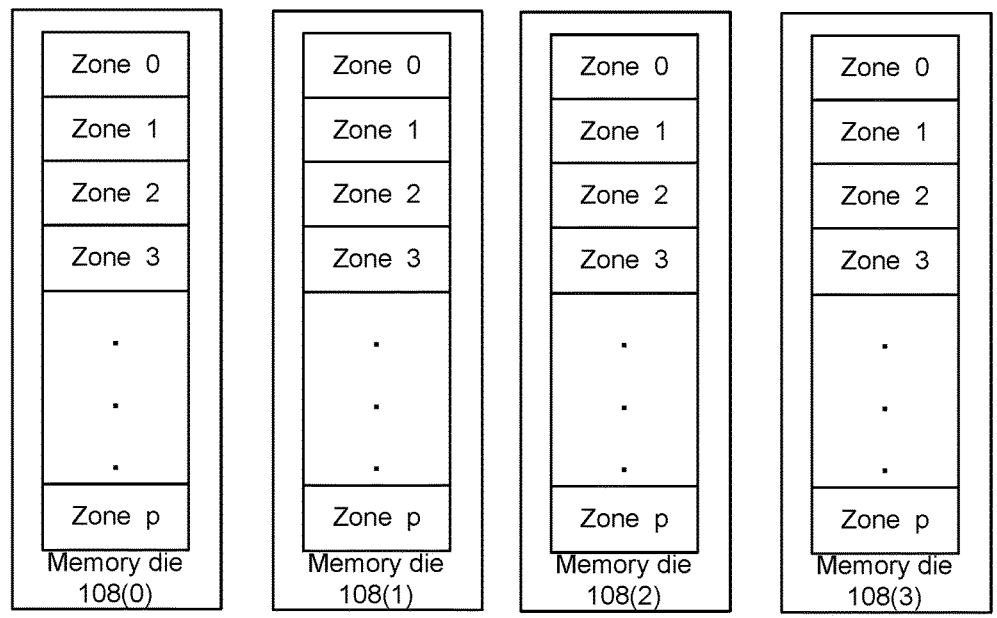
FIG. 4A depicts memory die, each with zones 0-p.

In one embodiment, the meta-groups are formed at a zone level. FIG. 4A depicts memory dies 108(0)-108(3), each with zones 0-p. A zone, as defined herein, comprises a plurality of blocks on the same memory die 108. For example, referring to FIG. 2E, zone 0 could include the even blocks 0 through 198; zone 1 could include even blocks 200 through 398, etc. The odd blocks could be also divided into zones. As another example, zone 0 could include blocks 0 to 99, zone 1 could include blocks 100 to 199. The zones do not need to all be the same size as each other. Also zones could be larger or smaller than 100 blocks.

Figure 4B:
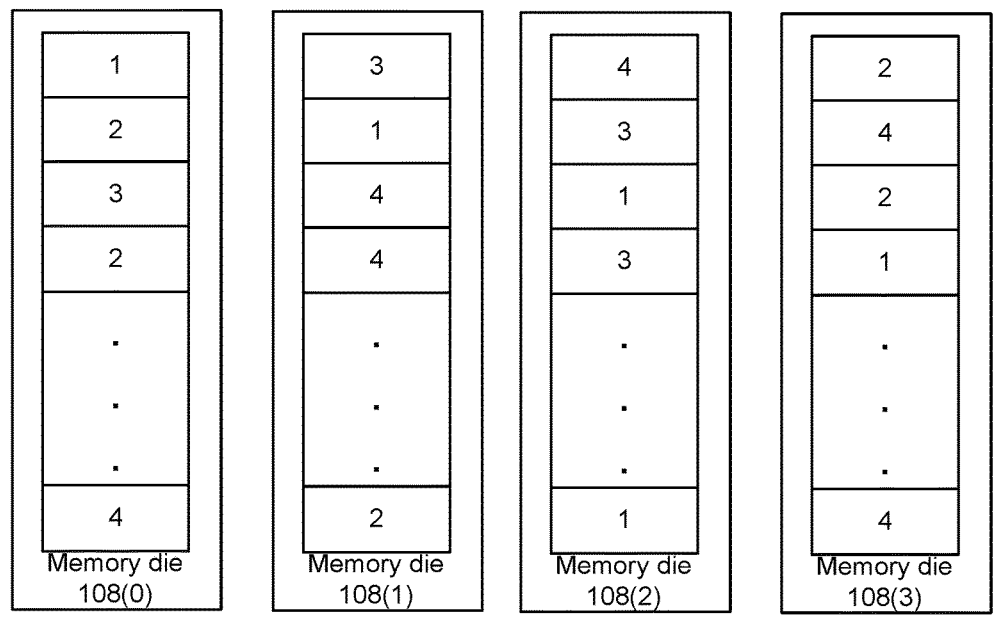
FIG. 4B represents an ordering of the Zones based on performance times.

Meta-zone 0A may include Zone 0 from dies 108(0) and 108(1), meta-zone 0B may include Zone 0 from dies 108(1) and 108(2). Likewise, meta-zone "xA" may be formed from zone "x" in dies 108(0) and 108(1), and meta-zone "xB" may be formed from zone "x" in dies 108(2) and 108(3). More than two dies could be included in a meta-zone. For example, if there are eight dies, four dies might be included in each meta-zone. In one embodiment of step 304, the control circuit measures or otherwise characterizes performance times of each of the zones. The control circuit may order the relative speed of corresponding zones on different memory dies. For example, the performance times of Zone 0 on each memory die may be ranked from fastest to slowest. FIG. 4B represents an ordering of the Zones based on performance times. The diagram shows the same zone from FIG. 4A, but the zones are not labeled in FIG. 4B. Rather, the numbers 1-4 rank relative performance times. In this example, for zone 0 (the top row in the diagram for each die), the relative ordering is die 108(0), die 108(3), die 108(1) and die 108(2). The meta-zones may be formed from this virtual ordering. For example, meta-zone 0A could include the two fastest zones for each die. Thus, meta-zone 0A may include memory die 108(0) and 108(3). Meta-zone 0B may include memory dies 108(1) and 108(2). In one embodiment, the memory system stores a meta-zone mapping table. Table I is one example of a mapping of dies to meta-zones consistent with the relative speeds depicted in FIG. 4B. The table maps die to meta-zones, at the zone level.

TABLE I

| Meta-Zone | Die 0 | Die 1 | Die 2 | Die 3 |
|---|---|---|---|---|
| 0A | Zone 0 | | Zone 0 | |
| 0B | | Zone 0 | | Zone 0 |
| 1A | Zone 1 | Zone 1 | | |
| 1B | | | Zone 1 | Zone 1 |
| 2A | | | Zone 2 | Zone 2 |
| 2B | Zone 2 | Zone 2 | | |
| 3A | Zone 3 | | | Zone 3 |
| 3B | | Zone 3 | Zone 3 | |
| ... | | | | |
| pA | | Zone p | Zone p | |
| pB | Zone p | | | Zone p |

Figure 5A:
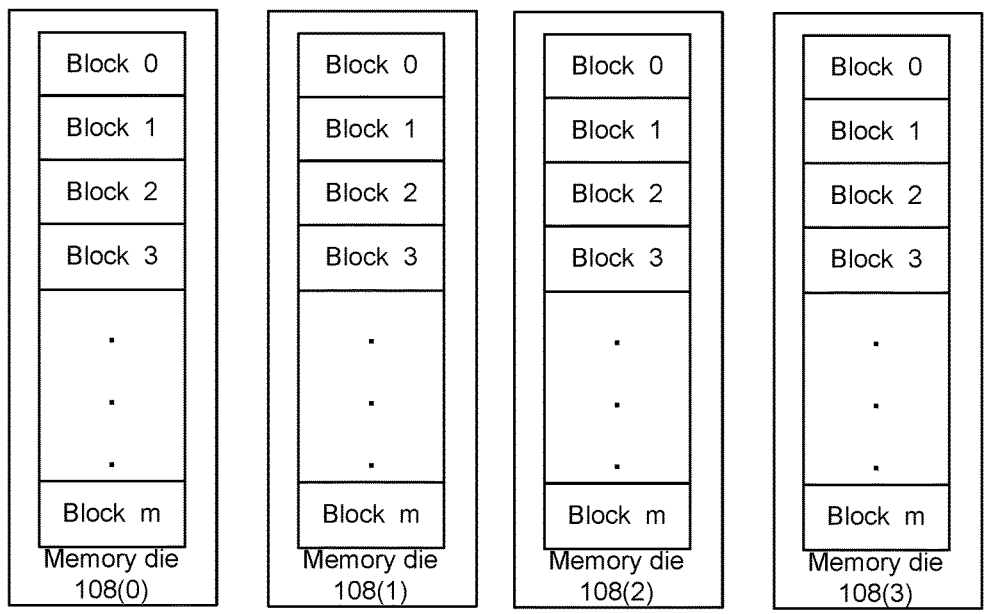
FIG. 5A depicts memory die, each with blocks 0-m.

In one embodiment, the meta-groups are formed at a block level. FIG. 5A depicts memory dies 108(0)-108(3), each with blocks 0-m. The default for meta-block 0A may include block 0 from dies 108(0) and 108(1). The default for meta-block 0B may include block 0 from dies 108(2) and 108(3), etc. In one embodiment of step 302, the control circuit measures or otherwise characterizes performance times of each of the blocks. The control circuit may order the relative speed of each block "x" on each memory die. For example, the speed of each Block 0 (on different die) may be ranked.

Figure 5B:
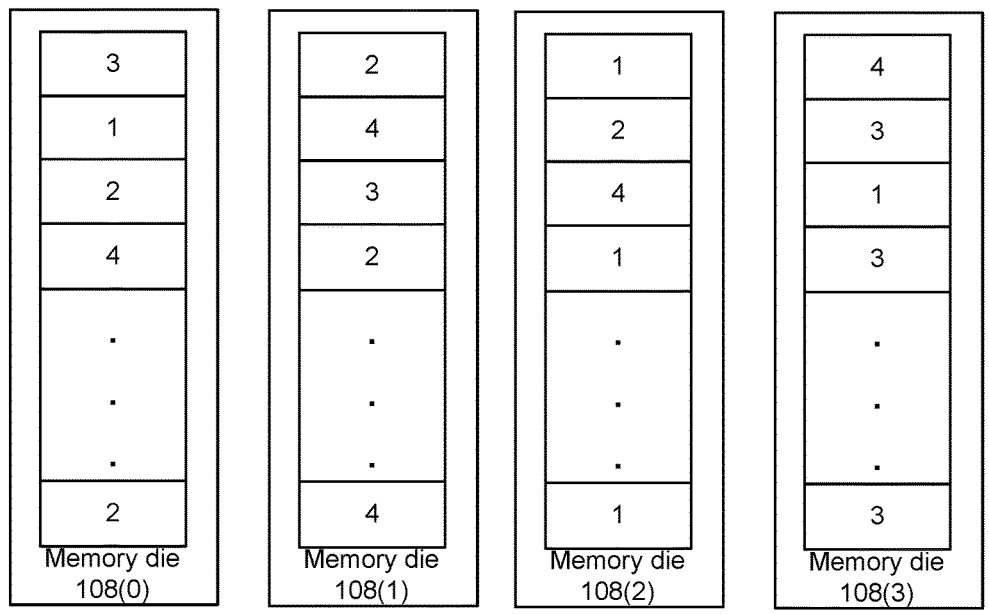
FIG. 5B represents an ordering of the blocks of FIG. 5A based on performance times.

FIG. 5B represents an ordering of the blocks of FIG. 5A based on performance times. The diagram shows the same blocks from FIG. 5A, but the blocks are not labeled in FIG. 5B. Rather, the numbers 1-4 rank relative performance times. The meta-blocks may be formed from this ordering. For example, meta-block 0A could include the fastest of the block "x" from each die. For example, meta-block 0A may include Block 0 from dies 108(1) and 108(2). Meta-block 0B may include Block 0 from dies 108(0) and 108(3). Table II is one example of a mapping of dies to meta-blocks consistent with the relative speeds depicted in FIG. 5B. In one embodiment, the memory system stores a meta-block mapping table. The table maps die to meta-blocks, at the block level.

TABLE II

| Meta-Block | Die 0 | Die 1 | Die 2 | Die 3 |
|---|---|---|---|---|
| 0A |  | Block 0 | Block 0 |  |
| 0B | Block 0 |  |  | Block 0 |
| 1A | Block 1 |  | Block 1 |  |
| 1B |  | Block 1 |  | Block 1 |
| 2A | Block 2 |  |  | Block 2 |
| 2B |  | Block 2 | Block 2 |  |
| 3A |  | Block 3 | Block 3 |  |
| 3B | Block 3 |  |  | Block 3 |
| ... |  |  |  |  |
| pA |  | Block p | Block p |  |
| pB | Block p |  |  | Block p |

Figure 6:
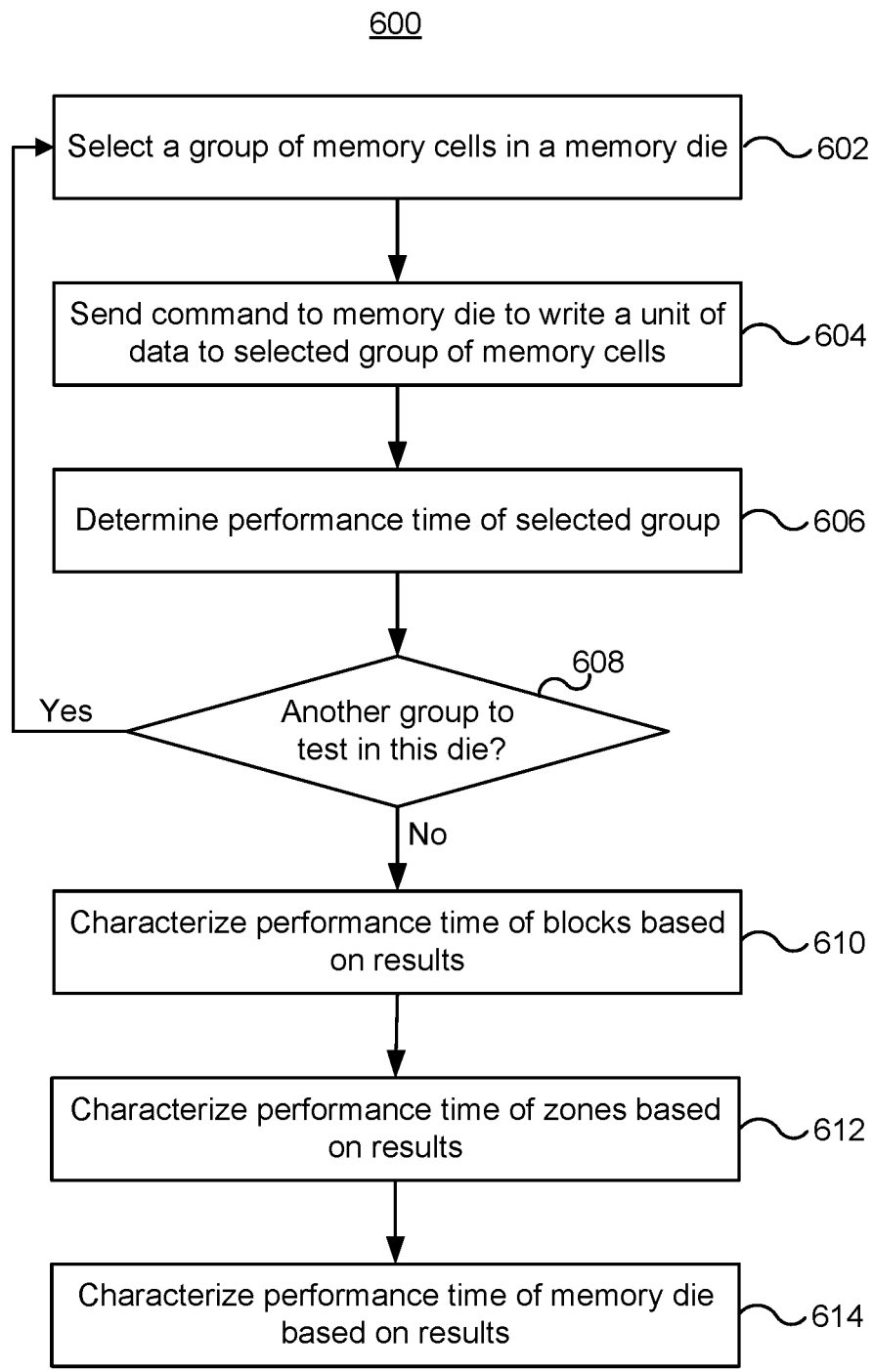
FIG. 6 is a flowchart of one embodiment of a process of measuring performance times of groups of non-volatile memory cells.

FIG. 6 is a flowchart of one embodiment of a process 600 of characterizing performance times of groups of non-volatile memory cells. The process 600 is one embodiment of step 302 of FIG. 3. The process 600 describes measuring performance for one memory die. The process 600 may be performed for each memory die in the memory system 100. Process 600 is performed when the memory system undergoes a power on reset, in one embodiment. Process 600 is performed when the device is being manufactured, in one embodiment. Process 600 may be used to characterize the performance time of an entire memory die, a plane on a memory die, a zone of multiple blocks of memory cells on a memory die, a single block of memory cells, or some other group of memory cells on a memory die.

In step 602, a group of non-volatile memory cells is selected for test. The group resides on a selected memory die. In one embodiment, a page of memory cells is selected. A page is the basic unit for read and write commands. Since the data to be written to the memory cells may be test data, it is possible to write a larger unit than a page. For example, a block write command can be performed.

In step 604, the memory controller sends a command that is addressed to the selected memory die for the selected group of memory cells to write some unit of data. This could be a command to write a single bit per memory cell or multiple bits per memory cell.

In step 606, the memory controller determines a performance time of the selected group. The memory controller measures the time between when the command was issued in step 604 and when the memory die responds that the data was successfully written, in one embodiment.

In step 608, a determination is made whether there are more groups of memory cells to be tested in this memory die. It is not necessary to measure the performance time of every memory cell on the die in order to characterize the performance time of the entire memory die. If there are more groups of memory cells to test, then the process 600 returns to step 602 to select another group of memory cells to test.

Step 610 is to characterize performance times of blocks of memory cells based on the results. The performance of a given block may be based on any subset of non-volatile memory cells in the block. The performance time could be based on one or multiple groups (e.g., pages) that were tested in steps 602-606. When based on multiple groups, the performance time may be an average, worst case (slowest), or some other technique.

Step 612 is to characterize the performance time of various zones that each include a subset of the blocks in the memory die, based on the performance times of the various groups of memory cells. In one embodiment, the performance time of one or more blocks (as determined by step 610) in a zone is used to characterize that zone. Step 612 can use a wide variety of techniques such as to average performance times, slowest performance times, or some other technique.

Step 614 is to characterize the performance time of the entire memory die, based on the performance times of the various groups of memory cells. This could be based on the performance times of the groups (e.g., pages of memory cells) that were tested, the characterization of blocks, zones, or some other unit of memory cells. Step 614 can use a wide variety of techniques such as to average performance times, slowest performance times, or some other technique.

While process 600 characterizes the performance times based on writing data, the performance times may be characterized based on some other memory array operation. Thus, one alternative is to measure read times. Another alternative is to measure erase times.

Figures 7A, 7B:
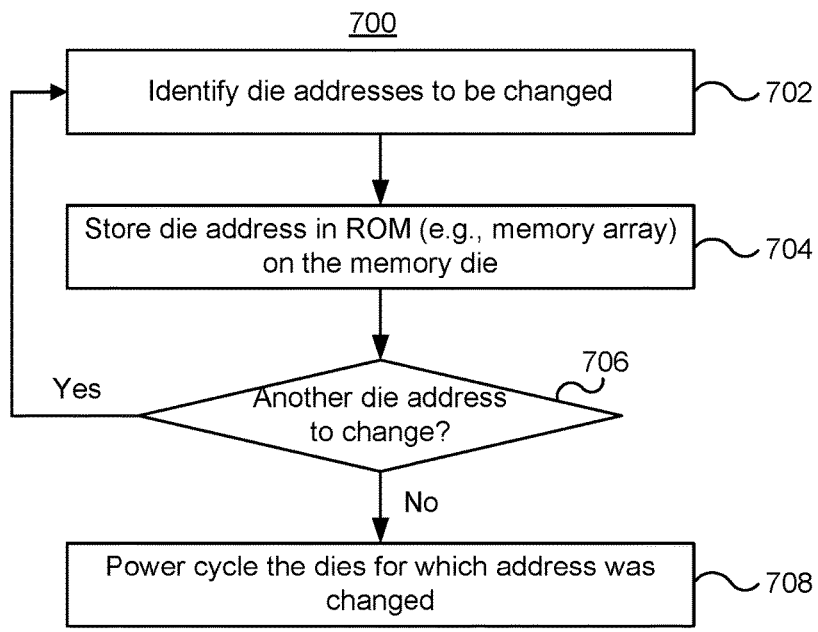
FIG. 7A is a flowchart of one embodiment of a process of establishing the die address for each meta-group, according to performance times.
FIG. 7B depicts one example for two meta-planes formed based on die speed.

In one embodiment, meta-groups are formed by establishing a CADD on each memory die. FIG. 7A is a flowchart of one embodiment of a process 700 of establishing the die address for each meta-group, according to performance times. Process 700 is one embodiment of step 304 of FIG. 3.

In step 702, the control circuit identifies die addresses to be changed. In one embodiment, step 702 includes examining meta-planes that are formed based on die speed. For example, FIG. 7B depicts one example for two meta-planes formed based on die speed. This example is consistent with the example of FIG. 1B. FIG. 7B shows a table with a row for each of eight memory dies. These memory dies are in the same memory package, in one embodiment. These eight memory dies share a common chip enable signal, in one embodiment. The original CADD is listed for each die. This may be the CADD that was assigned to the die based on its location in the memory package. For example, when memory packages are manufactured, each die may be assigned a CADD based on its location in the memory package. The relative speed of each memory die is listed in one column. This refers to an ordering of the speed of the dies from fastest to slowest. Process 600 may be used to characterize the speed of the dies. In one embodiment, the four fastest dies are placed in one meta-group, leaving the four slowest dies for the other meta-group. There could be more than two meta-groups for the package. In this example, the CADD of dies 3 and 6 may be changed to form the meta-groups. A simple procedure may be to swap these two die addresses.

In step 704, the control circuit stores the new CADD in ROM on the first memory die to have its CADD changed. In one embodiment, the control circuit instructs the memory die 108 to store the new CADD in CADD 127 in the storage device area 126*a*. Thus, the new CADD 127 is stored in non-volatile memory cells in the memory array 126, in one embodiment.

Step 706 is a test to determine whether other memory dies are to have their CADD changed. If so, step 704 is repeated for the next memory die. After all of the memory dies that need a change to their CADD have the new CADD stored in ROM, step 708 is performed. The table of FIG. 7B has a column for the new CADD to show one example.

In step 708, the memory dies that were programmed with a new CADD are power cycled. For example, a power on reset is performed. In response to the power on reset, the memory die may transfer the new CADD in ROM (e.g., CADD 127) to the CADD register 115.

An alternative to storing the die address in ROM in step 704 is to store the new die address in the CADD register 115 (in step 704). In this case, power cycling of the memory die is not performed in step 708; although after every power cycle of the entire memory system, the process of updating the CADD register is done, in one embodiment.

FIG. 7C includes some tables to illustrate another embodiment in which CADD are changed in order to, in effect, form meta-groups. FIG. 7C has four tables. Each table represents one memory package. Each memory package has four memory die, in this example. The original CADD are depicted in one column. The original CADD may also be referred to as a default CADD that may be assigned based on, for example, the physical location of the memory die within the memory package. In one embodiment, a meta-plane includes one die from each package. Table III shows one possible way in which meta-planes may be formed by default.

TABLE III

| Meta-Plane | Package 0 | Package 1 | Package 2 | Package 3 |
|---|---|---|---|---|
| 0 | Die 0 | Die 0 | Die 0 | Die 0 |
| 1 | Die 1 | Die 1 | Die 1 | Die 1 |
| 2 | Die 2 | Die 2 | Die 2 | Die 2 |
| 3 | Die 3 | Die 3 | Die 3 | Die 3 |

FIG. 7C has a column that depicts the relative speed of each die on each memory package. One possible way to form meta-planes based on the relative speed of the die is to order the die on each package in accordance with speed. The fastest die on each package may be assigned to one meta-plane, the second fastest die on each package may be assigned to another meta-plane, etc. The new CADD in FIG. 7C assign "000" to the fastest die on each package, etc. Table IV depicts one example of how the memory dies are mapped to meta-planes.

TABLE IV

| Meta-Plane | Package 0 | Package 1 | Package 2 | Package 3 |
|---|---|---|---|---|
| 0 | Die 0 | Die 2 | Die 2 | Die 2 |
| 1 | Die 2 | Die 0 | Die 1 | Die 3 |
| 2 | Die 3 | Die 3 | Die 0 | Die 0 |
| 3 | Die 1 | Die 1 | Die 3 | Die 1 |

Figure 8A:
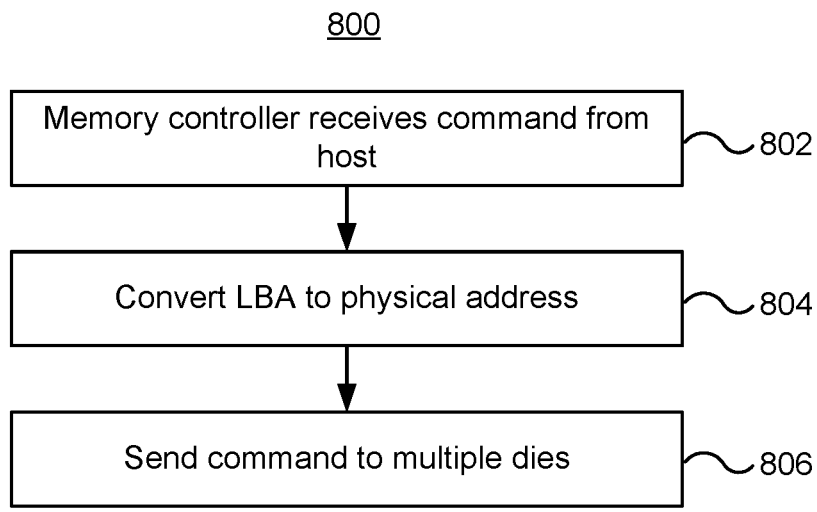
FIG. 8A is a flowchart of one embodiment of a process of performing memory array operations in parallel in multiple memory dies.

FIG. 8A is a flowchart of one embodiment of a process 800 of performing memory array operations in parallel in multiple memory dies. Process 800 may be used in conjunction with process 700. In other words, prior to performing process 800, the CADD may be established in accordance with the meta-groups. In one embodiment, the CADD in CADD 127 was set based on performance times. Then, the memory dies may be power cycled to cause the CADD register 115 to be loaded from CADD 127. In one embodiment, the CADD in CADD register 115 was set based on performance times, without changing the CADD in CADD 127. However, note that process 800 is not limited to these techniques that adjust the CADD.

In step 802, the memory controller 122 receives a command from a host to perform a memory array operation. The memory array operation may include, but is not limited to, read, program, and erase.

In step 804, the memory controller converts one or more logical block addresses (LBA) in the command to physical addresses in the memory system. In process 800 the physical addresses correspond to multiple memory dies. The multiple memory dies are part of a meta-group. In one embodiment, the memory controller determines logical unit numbers (LUN) for the memory dies in the meta-group.

In one embodiment, the memory controller always uses the same LUN for each meta-group. For example, with reference to the example of FIG. 7B, the memory controller may always use LUN 000, 001, 010, and 011 for meta-group 0 and LUN 100, 101, 110, and 111 for meta-group 1. Thus, note that regardless of how the memory dies were grouped into meta-groups, based on performance times, the memory controller can use the same meta-group mapping. As another example, with reference to the example of FIG. 7C, the memory controller may always use LUN 00 from each of several memory packages for meta-group 0, LUN 01 from each of several memory packages for meta-group 1, LUN 10 from each of several memory packages for meta-group 2, and LUN 11 from each of several memory packages for meta-group 3. These two examples are for purpose of illustration.

In step 806, the memory controller issues commands to the memory dies in the meta-group. The memory controller may issue one such command for each LUN. The memory controller may issue these commands very close to the same time, such that the memory dies can perform the memory array operations in parallel. Note that parallel operation does not require that each memory die begin the operation at exactly the same time. One reason for this, is that the memory dies may receive the commands at slightly different points in time.

Figure 8B:
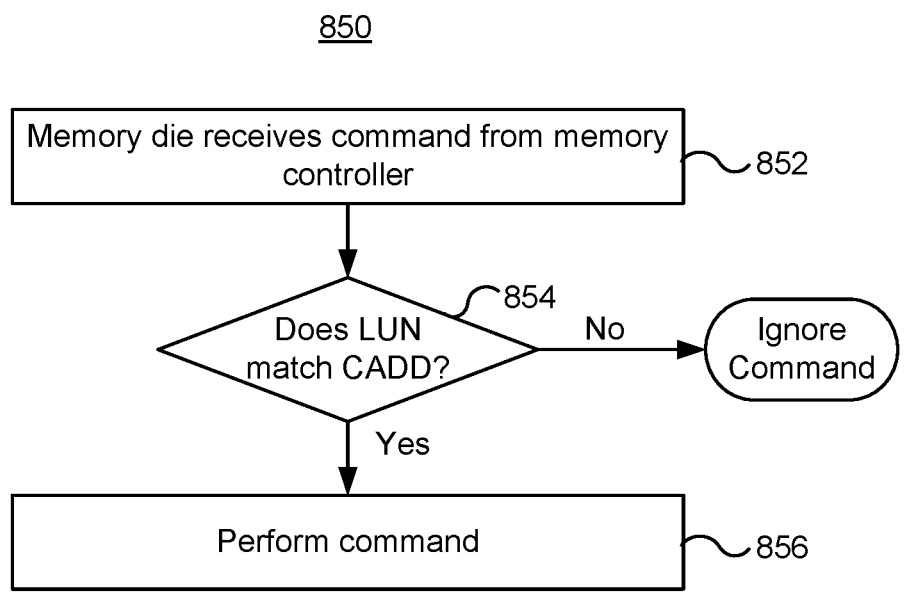
FIG. 8B is a flowchart of one embodiment of a process of a memory die performing a memory array operation in response to receiving a command from a memory controller.

FIG. 8B is a flowchart of one embodiment of a process 850 of a memory die performing a memory array operation in response to receiving a command from a memory controller. This process 850 could be used with an embodiment in which CADD are established on the memory die, based on performance time. But establishing the CADD on the memory die is not required. This process 850 could be also used with an embodiment in which the memory controller uses a meta-group mapping table, based on performance time.

Process 850 is performed in response to a command sent by the memory controller in process 800, in one embodiment. In one embodiment of step 852, a memory die 108 receives one of the commands sent by the memory controller in step 806. The command contains a LUN, in one embodiment.

In step 854, the memory die 108 compares the LUN in the command with its CADD. In one embodiment, the memory die 108 compares the LUN in the command with the CADD in CADD register 115. In one embodiment, the memory die 108 compares the LUN in the command with the CADD in CADD 127 in ROM. The CADD could be stored elsewhere on the memory die 108. If the LUN does not match the CADD, then the memory die ignores the memory array operation. If the LUN does match the CADD, then the memory die performs the memory array operation, in step 856. After completing the memory array operation, the memory die 108 may return a status (e.g., success, failure) to the memory controller.

Figure 9:
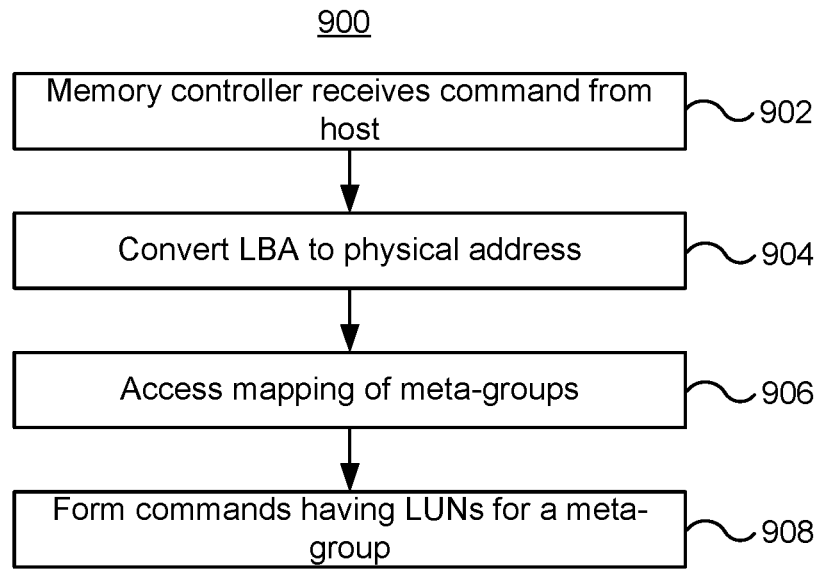
FIG. 9 is a flowchart of one embodiment of a process of performing memory array operations in parallel in multiple memory dies.

As noted herein, one embodiment includes storing a table of meta-groups. FIG. 9 is a flowchart of one embodiment of a process 900 of performing memory array operations in parallel in multiple memory dies. Process 900 has some similarities to process 800, which relies on a CADD being based on performance times. However, whereas in process 800, it was assumed that CADDs of the memory dies were changed to reflect the relative performance times, the CADDs are not changed prior to process 900. Instead, the memory controller has a table that includes mapping of meta-groups.

In step 902, the memory controller receives a command from the host to perform a memory array operation. The memory array operation may include, but is not limited to, read, program, and erase.

In step 904, the memory controller converts a LBA in the command to physical addresses in the memory system. In process 900 the physical addresses correspond to multiple memory dies. The multiple memory dies are part of a meta-group.

In step 906, the memory controller accesses a mapping of meta-groups. In one embodiment of step 906, the memory controller determines the LUNs for each of the members of the meta-group. For example, in connection with an example similar to FIG. 7B, the memory controller may have a table similar to Table V. This table maps LUNs to meta-groups. In this case, this is equivalent to mapping dies to meta-groups, as the LUNs are assumed to have already been stored in the dies (as, for example, the CADD).

TABLE V

| Meta-Group | LUNs |
|---|---|
| 0 | 000, 001, 010, 110 |
| 1 | 100, 101, 011, 111 |

Table V indicates which LUNs are in each meta-group. The mapping is the same as the "New CADDs" in the table of FIG. 7B. Thus, the meta-groups are formed based on the performance times of that example. This table can be stored as an alternative to storing the CADD in the memory dies in process 700. The table could be stored in RAM 122b, or elsewhere.

In step 908, the memory controller forms a command for each member of the meta-group. Each command has one of the LUNs. For example, if meta-group 0 was selected, then the memory controller may sends a first command with the LUN=000, a second command with the LUN=001, a third command with the LUN=010, and a fourth command with the LUN=110. These commands may be sent at about the same time, such that the die may execute the memory operations in parallel.

The various memory dies may operate in a similar manner to process 850 in FIG. 8B. As noted, their CADDs are not changed in one embodiment of process 900. Rather, the CADDs may be at the default values.

Note that many variations of the process 900 in FIG. 9 are possible. For example, rather than using Table V, Table IV could be used. Recall that Table IV is for an embodiment in which the meta-groups span different memory packages. An example of Meta-plane 0 from Table IV being the selected plane will be discussed. The memory controller may form a first command with LUN=00, which is sent to Package 0, a second command with LUN=10, which is sent to Package 1, a third command with LUN=10, which is sent to Package 2, and a third command with LUN=10, which is sent to Package 3. These commands may be sent at about the same time, such that the die may execute the memory operations in parallel.

The process 900 of FIG. 9 may also operate at a different level, such as a zone level, or block level. An example of operating at the block level will be discussed with respect to Table II. In this example, Meta-Block 0A is selected. The memory controller may issue a first command with LUN=01 (for die 1), and a second command with LUN=10 (for die 2). These commands may be sent at about the same time, such that the dies may execute the memory operations in parallel.

An example of operating at the zone level will be discussed with respect to Table I. In this example, Meta-Zone 0A is selected. The memory controller may issue a first command with LUN=00 (for die 1), and a second command with LUN=10 (for die 2). These commands may be sent at about the same time, such that the dies may execute the memory operations in parallel.

In one embodiment, rather than changing the CADD in the storage device area 126a, a chip address in the CADD register 115 is changed. This allows for greater freedom when forming meta-blocks and meta-zones. For example, CADD 127 in storage device area 126a may store the CADD that is used for forming meta-planes (a meta-plane may be formed at the memory die level). The chip address in the CADD register 115 can be dynamically changed during operation to allow the same die to have a different chip address for different meta-blocks or meta-zones. For the sake of discussion, the chip address in the CADD 127 will be referred to as a "hard chip address" and the chip address in the CADD register 115 will be referred to as a "soft chip address." The hard chip address of one embodiment is a default chip address that is stored in non-volatile memory in the memory system. The soft chip address is written into volatile memory from the non-volatile memory upon a power on reset, in one embodiment. Moreover, the soft chip address is what the memory die accesses during operation to determine its LUN, in one embodiment.

Figure 10:
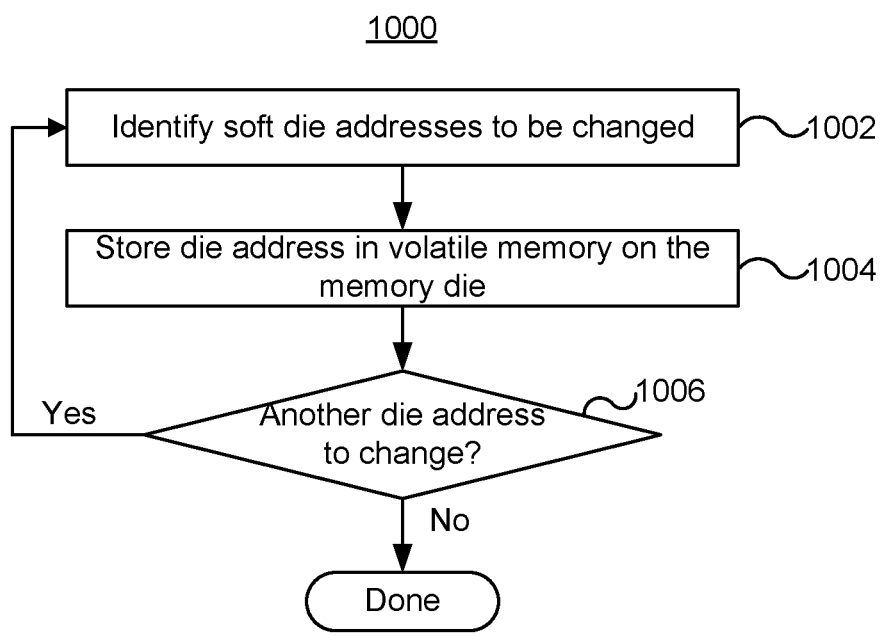
FIG. 10 is a flowchart of one embodiment of a process of establishing meta-groups by writing chip address volatile storage.

FIG. 10 is a flowchart of one embodiment of a process 1000 of establishing meta-groups by writing chip address volatile storage. Step 1002 is to identify a soft memory die address to be changed. Step 1002 may be performed in response to memory controller determining that a meta-block or meta-zone is to be formed. However, note that step 1002 could also be performed in response to a meta-plane or some other meta-group being formed.

First an example of meta-blocks will be discussed. Referring to Table II, Meta-Block 0A is selected. Meta-Block 0A has Die 1 and Die 2. Note that Meta Block 0B has Die 0 and Die 3. A suitable re-addressing may swap the on-die addresses of dies 0 and 2.

Step 1004 is to store the die addresses in volatile memory on the memory dies. Step 1006 is to determine whether other die addresses need to be changed. In the present example, CADD register 115 on memory die 108(0) is set to 10, and CADD register 115 on memory die 108(2) is set to 00. Assuming that the CADD register 115 on memory die 108(1) is already set to 01 and the CADD register 115 on memory die 108(3) is already set to 11 no changes are needed to those dies. However, if needed, the CADD register 115 on those memory dies are also changed.

After process 1000, the memory controller may send memory operations to the memory dies. In the present example, the memory controller sends a first command with LUN=00 and a second command with LUN=01. The memory dies may respond as in FIG. 8B. Note that each memory die should check the volatile memory (e.g., CADD register 115), as the non-volatile CADD (e.g., CADD 127) has not necessarily been changed.

Next an example of performing process 1000 based on meta-zones will be discussed. Referring to Table I, Meta-Zone 0A is selected. Meta-Zone 0A has Die 0 and Die 2. Note that Meta Zone 0B has Die 1 and Die 3. A suitable re-addressing may swap the on-die addresses of dies 1 and 2. In step 1004, CADD register 115 on memory die 108(1) is set to 10, and CADD register 115 on memory die 108(2) is set to 01. Assuming that the CADD register 115 on memory die 108(0) is already set to 00 and the CADD register 115 on memory die 108(3) is already set to 11 no changes are needed to those dies. However, if needed, the CADD registers 115 on those memory dies are also changed.

One embodiment includes an apparatus comprising: a plurality of memory dies and a control circuit in communication with the plurality of memory dies. Each memory die comprises a plurality of non-volatile memory cells. The control circuit is configured to characterize performance times of each of the memory dies. The control circuit is configured to form meta-groups based on the performance times. Each meta-group includes non-volatile memory cells on multiple ones of the plurality of the memory dies. The control circuit is configured to issue memory array operations for non-volatile memory cells in respective ones of the meta-groups to execute in parallel.

One embodiment includes a method of operating non-volatile storage having a plurality of memory dies. The method comprises characterizing performance times of each of the memory dies at performing a memory array operation. The method comprises forming meta-groups based on the performance times, wherein each meta-group includes non-volatile memory cells on multiple ones of the plurality of the memory dies. The method comprises issuing memory array operations for non-volatile memory cells in respective ones of the meta-groups to execute in parallel.

One embodiment includes a three-dimensional non-volatile storage device, comprising: a plurality of memory dies and a control circuit in communication with the plurality of memory dies. Each memory die comprises a three-dimensional array of non-volatile memory cells. The control circuit, for sets of non-volatile memory cells on the memory dies, measures a time for each of the sets to perform a memory array operation. Based on the performance times of the sets, the control circuit ranks the times of groups of non-volatile memory cells that reside on different memory dies with each other. The control circuit forms meta-groups based on the ranking of groups that reside on different memory dies. The control circuit issues memory array operations for non-volatile memory cells in respective ones of the meta-groups to execute in parallel.

One embodiment includes an apparatus comprising a plurality of memory dies, each memory die comprising a plurality of non-volatile memory cells. The apparatus comprises means for measuring performance times of groups of the non-volatile memory cells, wherein each of the groups resides on one of the plurality of memory dies. The apparatus comprises means for comparing the performance times of groups that reside on different memory dies with each other. The apparatus comprises means for forming meta-groups based on the performance times, wherein each meta-group includes non-volatile memory cells on multiple ones of the plurality of memory dies. The apparatus comprises means for issuing memory array operations for non-volatile memory cells in respective ones of the meta-groups to execute in parallel.

In one embodiment, the means for measuring performance times of groups of the non-volatile memory cells comprises one or more of controller 122, processor 122c, read/write circuits 128, sense blocks (SB1, SB2, . . . ), state machine 112, on-chip address decoder 114, power control 116. The means for measuring performance times of groups of the non-volatile memory cells may comprise executable code that executes on processor 122c. For example, storage device area 126a may store such code, which may be loaded into RAM 122b, and executed on processor 122c. The means for measuring performance times of groups of the non-volatile memory cells may comprise other hardware and/or software that executes on a processor.

In one embodiment, the means for comparing the performance times of groups that reside on different memory dies with each other comprises one or more of controller 122, processor 122c. The means for comparing the performance times of groups that reside on different memory dies with each other may comprise executable code that executes on processor 122c. For example, storage device area 126a may store such code, which may be loaded into RAM 122b, and executed on processor 122c. The means for measuring performance times of groups of the non-volatile memory cells may comprise other hardware and/or software that executes on a processor.

In one embodiment, the means for forming meta-groups based on the performance times comprises one or more of controller 122, processor 122c, storage device 126a, CADD 127, CADD register 115, read/write circuits 128, sense blocks (SB1, SB2 . . . ), power control 116, parameter storage 113, on-chip address decoder 114, state machine 112. The means for forming meta-groups based on the performance times may comprise executable code that executes on processor 122c. For example, storage device area 126a may store such code, which may be loaded into RAM 122b, and executed on processor 122c. The means for means for forming meta-groups based on the performance times may comprise other hardware and/or software that executes on a processor.

In one embodiment, the means for issuing memory array operations for non-volatile memory cells in respective ones of the meta-group to execute in parallel comprises one or more of controller 122, processor 122c, storage device 126a, CADD 127, CADD register 115, read/write circuits 128, sense blocks (SB1, SB2 . . . ), power control 116, parameter storage 113, on-chip address decoder 114, state machine 112. The means for issuing memory array operations for non-volatile memory cells in respective ones of the meta-group to execute in parallel may comprise executable code that executes on processor 122c. For example, storage device area 126a may store such code, which may be loaded into RAM 122b, and executed on processor 122c. The issuing memory array operations for non-volatile memory cells in respective ones of the meta-group to execute in parallel may comprise other hardware and/or software that executes on a processor.

Corresponding methods, systems and computer- or processor-readable storage devices which have executable code for performing the methods provided herein may also be provided.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

We claim:

1. An apparatus comprising:
  a plurality of memory dies, each memory die comprising a plurality of non-volatile memory cells; and
  a control circuit in communication with the plurality of memory dies, the control circuit configured to:
  characterize performance times of each memory die;
  form meta-groups based on the performance times, including place groups of the non-volatile memory cells having similar performance times in the same meta-group, wherein each meta-group includes non-volatile memory cells on multiple ones of the memory dies; and
  issue memory array operations for non-volatile memory cells in respective ones of the meta-groups to execute in parallel, including form, for each meta-group, a set of commands for the respective meta-group to perform memory array operations in parallel, each command in each set having a die address for a different one of the memory dies.

2. The apparatus of claim 1, wherein to place groups of the non-volatile memory cells having similar performance times in the same meta-group the control circuit is configured to:
  place groups of the non-volatile memory cells having the slowest performance times in the same meta-group.

3. The apparatus of claim 2, wherein to place groups of the non-volatile memory cells having similar performance times in the same meta-group the control circuit is further configured to:
  place groups of the non-volatile memory cells having the fastest performance times in the same meta-group.

4. The apparatus of claim 1, wherein to form the meta-groups based on the performance times the control circuit is configured to:
  change at least two memory die addresses of the plurality of memory dies based on the performance times.

5. The apparatus of claim 1, wherein to form the meta-groups based on the performance times the control circuit is configured to:
  store a meta-group table that maps memory dies to the meta-groups based on the performance times.

6. The apparatus of claim 5, wherein, to issue memory array operations for non-volatile memory cells in respective ones of the meta-groups to execute in parallel, the control circuit is configured to:
  access the meta-group table; and
  form the sets of commands based on the meta-group table.

7. The apparatus of claim 1, wherein each of the groups of non-volatile memory cells is a block of non-volatile memory cells, wherein to form meta-groups based on the performance times the control circuit is configured to:
  select individual blocks from ones of the plurality of memory dies for inclusion into a meta-group based on the performance times of the individual blocks.

8. The apparatus of claim 1, wherein each of the groups of non-volatile memory cells is a set of blocks of non-volatile memory cells on one of the plurality of memory dies, wherein to form meta-groups based on the performance times the control circuit is configured to:
  select a set of blocks from ones of the memory dies for inclusion into a meta-group based on the performance times of the sets of blocks.

9. The apparatus of claim 1, wherein to form meta-groups based on the performance times the control circuit is configured to:
  select a set of the plurality of memory dies for inclusion into a meta-group based on the performance times of the plurality of memory dies.

10. The apparatus of claim 1, wherein the plurality of non-volatile memory cells on a given memory die are part of a three-dimensional memory array.

11. A method of operating non-volatile storage having a plurality of memory dies, each memory die comprising a plurality of non-volatile memory cells, the method comprising:
  characterizing performance times of each of the memory dies at performing a memory array operation;
  forming meta-groups based on the performance times, including placing groups of the non-volatile memory cells having the slowest performance times in the same meta-group, wherein each meta-group includes non-volatile memory cells on multiple ones of the plurality of the memory dies; and
  issuing memory array operations for non-volatile memory cells in respective ones of the meta-groups to execute in parallel, including forming, for each meta-group, a set of commands for the meta-group to perform memory array operations in parallel, each command in each set having a logical unit number (LUN) for a different one of the memory dies.

12. The method of claim 11, wherein the forming meta-groups based on the performance times further comprises placing groups of memory cells having similar performance times in the same meta-group.

13. The method of claim 11, wherein the forming meta-groups based on the performance times further comprises:
  establishing memory die addresses in the plurality of the memory dies based on the performance times.

14. The method of claim 11, wherein the issuing memory array operations for non-volatile memory cells in respective ones of the meta-group to execute in parallel comprises:
  accessing a meta-group table that defines meta-groups based on the plurality of memory dies; and
  forming the sets of commands based on the meta-group table.

15. The method of claim 11, wherein measuring performance times of groups of non-volatile memory cells and forming meta-groups based on the performance times comprise:
  determining a time to complete the memory array operation that is characteristic of individual blocks of non-volatile memory cells; and placing individual blocks from ones of the memory dies into a meta-group based on the time to complete the memory array operation that is characteristic of the individual blocks.

16. The method of claim 11, wherein measuring performance times of groups of non-volatile memory cells and forming meta-groups based on the performance times comprise:
for a zone of blocks of non-volatile memory cells on each of the memory dies, determining a time to complete the memory array operation that is characteristic of the zone; and
placing the zones from ones of the memory dies into a meta-group based on the time to complete the memory array operation that is characteristic of the zones.

17. The method of claim 11, wherein forming meta-groups based on the performance times further comprises:
placing ones of the memory dies into a meta-group based on the performance times of each of the memory dies.

18. The method of claim 11, wherein forming the meta-groups based on the performance times further comprises placing groups of memory cells having fastest performance times in the same meta-group.

19. A three-dimensional non-volatile storage device, comprising:
a plurality of memory dies, each memory die comprising a three-dimensional array of non-volatile memory cells; and
a control circuit in communication with the plurality of memory dies, the control circuit:
for sets of non-volatile memory cells on the memory dies, measures a time for each of the sets to perform a memory array operation;
ranks the times of groups of non-volatile memory cells that reside on different memory dies with each other, based on the times of the sets;
forms meta-groups based on the ranking of groups that reside on different memory dies, including places groups of the non-volatile memory cells having rankings that are close to each other in the same meta-group; and
issues memory array operations for non-volatile memory cells in respective ones of the meta-groups to execute in parallel, including, for each meta-group, form a set of commands to perform memory array operations in parallel, each command in each set having a die address for a different one of the memory dies.

20. An apparatus comprising:
a plurality of memory dies, each memory die comprising a plurality of non-volatile memory cells; and
means for measuring performance times of groups of the non-volatile memory cells, wherein each of the groups resides on one of the plurality of memory dies;
means for comparing the performance times of groups that reside on different memory dies with each other;
means for forming meta-groups based on the performance times, including means for placing groups of the non-volatile memory cells having fastest performance times in the same meta-group, wherein each meta-group includes non-volatile memory cells on multiple ones of the plurality of memory dies; and
means for issuing memory array operations for non-volatile memory cells in respective ones of the meta-groups to execute in parallel, including means for forming sets of commands for each of the meta-groups to perform memory array operations, each command in each set having a die address for a different one of the memory dies.

* * * * *